United States Patent [19]

Tamhankar et al.

[11] Patent Number: 5,468,459
[45] Date of Patent: Nov. 21, 1995

[54] GAS STREAM TREATMENT METHOD FOR REMOVING PER-FLUOROCARBONS

[75] Inventors: Satish S. Tamhankar, Scotch Plains; Ramakrishnan Ramachandran, Allendale, both of N.J.

[73] Assignee: The BOC Group, Inc., New Providence, N.J.

[21] Appl. No.: 395,344

[22] Filed: Feb. 28, 1995

[51] Int. Cl.$^6$ .................................................. B01J 31/02
[52] U.S. Cl. ........................... 423/240.S; 423/245.1; 423/490; 423/497; 423/210; 588/206; 588/248
[58] Field of Search .................... 423/240 S, 245.1, 423/490, 497, 210; 588/206, 248

[56] References Cited

U.S. PATENT DOCUMENTS

| | | | |
|---|---|---|---|
| 4,937,065 | 6/1990 | Maurer et al. | 423/659 |
| 5,176,897 | 1/1993 | Lester | 423/659 |
| 5,213,767 | 5/1993 | Smith et al. | 422/117 |
| 5,245,112 | 9/1993 | Hoshimoto et al. | 588/206 |
| 5,260,036 | 11/1993 | Weigold et al. | 422/186.3 |
| 5,276,249 | 1/1994 | Greene et al. | 588/206 |
| 5,284,605 | 2/1994 | Nicolas | 252/630 |
| 5,298,229 | 3/1994 | Hardwick | 423/210 |
| 5,304,702 | 4/1994 | Weiss et al. | 588/206 |
| 5,322,674 | 6/1994 | Mori | 423/204 S |
| 5,354,962 | 11/1994 | Mizuno et al. | 212/121.52 |

FOREIGN PATENT DOCUMENTS 60-054723  3/1985  Japan.

*Primary Examiner*—Michael Lewis
*Assistant Examiner*—Linda L. Gray
*Attorney, Agent, or Firm*—David M. Rosenblum; Larry R. Cassett

[57] ABSTRACT

A per-fluorocarbon containing gas is treated by contacting per-fluorocarbon contained within the gas with calcium hydride at a temperature in a range of between about 450 and 900° C. The calcium hydride can be contained in a bed mixed with silicon or calcium oxide and such bed can be used in conjunction with a downstream bed of calcium oxide to remove any hydrogen fluoride produced. Also, an upstream bed of calcium fluoride can be used to treat acid gases in case of semiconductor processing applications of the present invention.

12 Claims, No Drawings

GAS STREAM TREATMENT METHOD FOR REMOVING PER-FLUOROCARBONS

BACKGROUND OF THE INVENTION

The present invention relates to a method in which a gas stream contaminated with per-fluorocarbons is treated by contacting the per-fluorocarbons with calcium hydride at an elevated temperature.

In semiconductor fabrication techniques of plasma assisted chemical vapor deposition, process gases are used in depositing materials on silicon wafers in one or more deposition stages. Since the deposition stages result in material being deposited on the interior of the processing chamber itself, the processing chamber must be cleaned at conclusion of the deposition stages. In order to clean the interior of the processing chamber, a per-fluorocarbon, for instance, carbon tetrafluoride ($CF_4$) or hexafluoroethane ($C_2F_6$) and oxygen are introduced into the processing chamber to react with materials which have been deposited on the walls of the processing chamber. In another fabrication technique known in the art as plasma etch, carbon tetrafluoride and hexafluoroethane are used to selectively remove deposited materials from the substrate. Both techniques, plasma assisted chemical vapor deposition and plasma etch, use excess amounts of such per-fluorocarbons and as a result, an exhaust gas discharged from the processing chamber will comprise per-fluorocarbons.

At various stages of the semiconductor fabrication process, per-fluorocompounds such as nitrogen trifluoride (which is used in tungsten depositions) are removed from the exhaust gas stream by a gas reactor column having silicon and calcium oxide containing stages which are effective to treat nitrogen trifluoride and other per-fluorocompounds but which are not effective in treating carbon tetrafluoride or hexafluoroethane. A gas reactor column used for such treatment is fully described in U.S. Pat. No. 5,213,767.

The use of per-fluorocarbons and per-fluorocompounds is not limited to semiconductor production. Per-fluorocarbons are produced by the Hall-Heroult process. In this process, alumina is dissolved in cryolite and then is reduced electrochemically to metallic alumina. This process occurs at about 1000° C. with carbon acting as both electrodes. The per-fluorocarbons are produced as a by-product when the amount of alumina contained within the electro-chemical cell is low purity.

Although combustion and incineration techniques have been proposed to treat per-fluorocarbons, in practice, exhaust streams containing per-fluorocarbons are simply vented to the atmosphere from the semiconductor etching processes. It is to be noted that the treatment of carbon tetrafluoride produced in excimer lasers from excimer gases is known in the art. In DE 4002642, carbon tetrafluoride is removed from a laser gas by exposing such gas to an alkaline earth metal such as calcium at temperature above 450° C. to produce carbon. This treatment is not effective when the gases to be treated emanate from the cleaning stage of a semiconductor etching process because not enough of the per-fluorocarbon compound will be converted. Simply stated, the cleansing process disclosed in DE 4002642 does not work when large volumes of gases are to be treated.

The problem with per-fluorocarbon release is that it is thought that per-fluorocarbons constitute an environmental hazard and a contributor to the global warming effect. Hence their exists a need to remove per-fluorocarbons from exhaust gas streams through simple and effective reaction techniques. As will be discussed, the present invention provides a method of treating a per-fluorocarbon containing gas stream which can be efficiently used and form part of a plasma enhanced vapor deposition process or a plasma etch process used in fabricating semi-conductors.

SUMMARY OF THE INVENTION

The present invention provides a method of treating a per-fluorocarbon containing gas to remove per-fluorocarbon contained within the gas. The method comprises contacting the per-fluorocarbon contained within the gas with calcium hydride at a temperature in a temperature range of between about 450° C. and about 900° C.

DETAILED DESCRIPTION

It has been found by the inventors herein that through unknown chemical reactions, per-fluorocarbons will react with calcium hydride to produce $CaF_2$. The present invention can be incorporated into or used in connection with a gas reactor column such as illustrated in U.S. Pat. No. 5,213,767 which is incorporated by reference as if fully set forth herein. Additionally, the present invention can be incorporated into a bed used in connection with other processes, for instance the Hall process discussed above.

Preferably, when used in connection with semiconductor processing the present invention is directly incorporated into the gas reactor column mentioned above and modified so that the gas reactor column consists of a fast bed of granular lime (CaO), a second bed of calcium hydride mixed with silicon in a metallic uncombined form, and a third bed of lime. All three beds are packed into a single vessel so that the gas stream to be treated fast enters the fast bed, then enters the second bed, and subsequently enters the third bed. The vessel is placed in a furnace to maintain reaction temperature or can be packaged within electrical heater elements in the same manner as the gas reactor column mentioned above. Alternatively, a calcium hydride bed can be provided as a separate unit either downstream of the gas reactor column or between a silicon bed and a calcium oxide bed so that the gas reactor column consists of, in sequence, calcium oxide, silicon, calcium hydride, and calcium oxide beds.

In the three bed gas reactor column (containing the mixed silicon and calcium hydride second bed), the gas reactor column is attached to the outlet of a vacuum pump used in connection with the wafer processing chamber. During a deposition stage of the process, excess etching gases such as nitrogen trifluoride enter the gas reactor column. During a subsequent cleaning stage, a cleansing gas stream comprising nitrogen, carbon tetrafluoride or hexafluoroethane and oxygen is passed through the processing chamber and then through the gas reactor column. Any acid gases and a number of other contaminants are removed by the first bed. Etching gases such as nitrogen trifluoride react with the silicon in the second bed. During the cleaning stage the calcium hydride in the second bed removes the carbon tetrafluoride or hexafluoroethane from the cleansing gas and the third bed containing calcium oxide removes any hydrogen fluoride formed during removal of the per-fluorocarbons.

Although the present invention encompasses the use of a free standing bed of calcium hydride, preferably in any application of the present invention, the calcium hydride is mixed with silicon particles or granular lime. Also, since hydrogen fluoride may be produced from the reaction between calcium hydride and per-fluorocarbon, the present invention is best utilized with a downstream bed of calcium oxide supplied in the form of granular lime. In any application of the present invention an upstream bed of granular lime can be used to treat acid gases present in the contaminated gas stream. Also in any application of the present invention, the lime may be mixed with particles of metallic or uncombined silicon to prevent agglomeration of the time. In any bed, the silicon should be approximately at least about 95% pure. Also the mixture of silicon and calcium hydride should be in a range of between about 25% and about 75% by weight of silicon. The mixture of calcium oxide and calcium hydride should be about 25% and about 75% by weight of calcium oxide. The amount of calcium hydride to be used in a bed will of course be based upon performance requirements for the bed. In this regard, is was found by the inventor herein that calcium hydride has a removal capacity in a range of between about 20.0 and about 40.0 cubic centimeters of either hexafluoroethane or carbon tetrafluoride per gram of calcium hydride.

The reaction temperature at which the per-fluorocarbon is contacted with the calcium hydride should be in a range of between about 450° C. and about 900° C. Any bed in accordance with the present invention should be maintained at a temperature within this temperature range. A particularly preferred temperature range in accordance with the present invention is between about 500° C. and about 700° C. This latter range is preferred for its lower temperatures. An operational temperature below about 600° C. is particularly preferred. In plasma assisted chemical vapor disposition operations, per-fluorocarbons are used intermittently for the purpose of cleaning the equipment. At other times, the off-gas from such operation is essentially reducing in nature. If the temperature is maintained at or below 600° C., the calcium hydride will remain stable. Also, since other contaminants are removed first by the granular lime, they have no effect on the calcium hydride. Only ammonia may escape unaffected from the lime bed but it is not only not harmful to the calcium hydride but also may in fact be effective in preserving the calcium hydride by providing a reducing atmosphere.

In a reactor constructed in accordance with the present invention about 60 grams of granular calcium hydride (granules of about 1 mm in size) was packed in a 2.54 cm diameter stainless steel vessel. In the same vessel, 50 grams of lime was packed so as to be directly downstream from the calcium hydride when in the vessel was in use. The reactor was heated to about 500° C. and a flow of nitrogen through the vessel was initiated at a flow rate of about 1.0 liters per minute. A flow of about 2% by volume of hexafluoroethane was added to the flow of nitrogen when the reactor temperature as measured at the center of the bed was stable at 454° C. The reactor temperature thereafter rose to 625° C. within about 15 minutes and then slowly dropped to about 450° C. in about an hours time. Throughout the time period, the reactor outlet contained essentially no hexafluoroethane.

For purposes of comparison, a reactor was constructed that contained metallic calcium in granular form (granules of between about 3 to about 5 millimeters in size) packed in a 2.54 cm diameter stainless steel vessel. Approximately 50 to about 80 grams of material was used. After purging the reactor with nitrogen at a flow rate of about 500 cubic centimeters per minute a gas stream containing 2% by volume of hexafluoroethane in nitrogen was added. The reactor was heated to 800° C. When the temperature reached about 685° C. only about 40% to about 50% of the hexafluoroethane was converted. Thus, it can be seen that the use of metallic calcium to treat per-fluorocarbons would only be effective with very dilute streams.

While the invention has been described with reference to the preferred embodiment, it will occur to those skilled in the art that numerous additions and changes can be made without departing from the spirit and scope of the present invention.

We claim:

1. A method of treating a per-fluorocarbon containing gas stream to remove per-fluorocarbon from said gas stream, said method comprising contacting the per-fluorocarbon contained within said per-fluorocarbon containing gas stream with calcium hydride at a temperature in a temperature range of between about 450° C. and about 900° C.

2. The method of claim 1, wherein said temperature range is between about 500° C. and about 700° C.

3. The method of claim 1 wherein said temperature is less than about 600° C.

4. The method of claim 1, wherein said unreacted per-fluorocarbon is contacted with said calcium hydride by passing said gas stream through a bed containing said calcium hydride in granular form.

5. The method of claim 4, wherein said bed contains silicon granules mixed with said calcium hydride so that said gas stream contacts said silicon granules and said calcium hydride.

6. The method of claim 4, wherein said bed contains calcium oxide granules mixed with said calcium hydride so that said gas stream contacts said calcium oxide granules and said calcium hydride.

7. The method of claim 4 or claim 5 or claim 6, further including passing said gas stream through a downstream bed comprising calcium oxide.

8. The method of claim 7 further comprising passing the gas stream through an upstream bed comprising calcium oxide prior to passing the gas stream through said bed containing said calcium hydride.

9. The method of claim 7, wherein said temperature range is between about 500° C. and about 700° C.

10. The method of claim 7 wherein said temperature is less than about 600° C.

11. The method of claim 7, wherein said gas stream comprises carbon tetrafluoride.

12. The method of claim 7, wherein said gas stream comprises hexafluoroethane.

* * * * *